United States Patent
Makabe

[15] 3,674,823

[45] July 4, 1972

[54] COMPOUND OF GERMANIC ACID AND CYSTEINE

[72] Inventor: Kazuo Makabe, Kamakura, Japan

[73] Assignee: Daiichi Yakuhin Sangyo Kabushiki Kaisha, Tokyo-to, Japan

[22] Filed: Feb. 20, 1970

[21] Appl. No.: 13,182

[30] Foreign Application Priority Data

April 2, 1969 Japan..................................44/25338

[52] U.S. Cl......................260/429 R, 260/429 J, 260/429 K, 424/287
[51] Int. Cl.......................................C07f 7/00, A61k 27/00
[58] Field of Search ...................260/429, 439, 429.7, 429.9

[56] References Cited

OTHER PUBLICATIONS

Beilstein Handbuch der Organishen Chemie. Vierte Auplage, Zweites Erganzungwerk 1942, p. 924– 5. Springer-Verlag, Berlin Primary Examiner—Tobias E. Levow
Assistant Examiner—A. P. Demers
Attorney—Scrivener, Parker, Scrivener & Clarke

[57] ABSTRACT

Novel compound of germanic acid and cysteine which displays therapeutic effects for inflammatory diseases and water-eczema (caused by pompholyx trichophytia) and process for preparation thereof by the addition of cysteine to an aqueous solution of germanic acid which is obtained by dissolving germanium dioxide in heated water.

2 Claims, No Drawings

COMPOUND OF GERMANIC ACID AND CYSTEINE

DETAILED EXPLANATION OF THE INVENTION

This invention relates to the novel compound of germanic acid and cysteine which displays therapeutic effects for, inflammatory diseases and water-eczema when taken orally or injected and a process for the preparation thereof by the addition of cysteine to an aqueous solution of germanic acid which is obtained by dissolving germanium dioxide in heated water.

This invention relates to a novel compound of germanic acid and cysteine which displays therapeutic effects, and a process for the manufacture thereof characterized in that cysteine is added to an aqueous solution of germanic acid obtained as a result of dissolution of germanium dioxide in heated water whereby the cysteine is heated and made to react with said solution with its pH adjusted to the value of approximately 4. The reaction mixture is concentrated and the compound according to the invention is crystallized out by cooling or precipitated by the addition of an organic solvent such as methyl alcohol, ethyl alcohol or acetone. The crystalline product is recovered by filtration and dried.

The following is the reason why pH has to be adjusted to the value of approximately 4 through the addition of cysteine to the solution of germanic acid in the process of this invention:

An aqueous neutral solution of cysteine, is very unstable, and if heated, converted to a thiazolidine derivative. If it is heated in an alkaline medium it is converted to pyruvic acid with the formation of hydrogen sulfide and ammonia, and under such condition germanic acid cannot be combined with cysteine.

The compound obtained by the process of this invention is an odorless white crystalline powder, easily soluble in water. The aqueous solution thereof is colorless and transparent, and of slightly sweet taste. It is acidic and a 1 percent solution thereof shows a pH of 4.3 at a temperature of 13° C, and a 0.2 percent solution shows a pH of 4.6 at the same temperature. This compound cannot be dissolved in an organic solvent. If heated, it is decomposed and fails to show a definite melting point; it reacts positively on both nitroprussiate reagent and phenylfuroron, indicating that it is the combination of germanic acid and cysteine.

The compound according to the invention is completely free from toxicity. Whether it is taken orally or injected, the internal organs are not affected after the circulation thereof in the body. It is excreted entirely through feces, urine and sweat. In the case of hypodermic injection, its $LD_{50}$ for mice is 2.75g/Kg.

The product of this invention was injected into a mouse that had been made to suffer from liver disease caused by carbon tetrachloride, and the mouse was subjected to a microscopic examination as to the possible appearance of fatty degeneration, with the result that no fatty degeneration was found. A patient suffering from serum hepatitis was made to take 60mg of this product per day for about 15 days with the result that his condition took a favorable turn. Patients suffering from rheumatism were made to take 60mg of this product per day for about 15 days with the result that most of them became convalescent. A patient suffering from water-eczema was made to take 60mg of this product per day for about one month with the result that his condition took a favorable turn.

A male patient, age 40, after 6 months hospitalization for a condition diagnosed as acute hepatitis and an unsatisfactory period of convalesence, was given a tablet of this invention, 1 tablet (containing 25mg of this material) at a time, twice daily. After about 3 months, treatment was terminated and recovery appeared complete. No side effects were noted during administration of the drug according to the invention.

A female patient, age 42, whose case was diagnosed as chronic rheumatic arthritis (in the third stage 7 years after onset) by the diagnosis standard established by the American Rheumatism Association was treated by injecting the medicine (25mg/1ml) into 6 to 8 different spots of the affected area two or three times a week in the amount of 0.2 – 0.3ml at a time. The result was that pain was promptly removed, swelling subsided to a certain extent, and no relapse occurred in the area of injection. The general health of the patient became better as the frequency of injection was increased. Thus, the patient had her health restored to a normal condition after two months. For 5 months thereafter, she had not suffered a recurrence of the disease. Thus, it is established that the compound according to the invention has the utility alleged. The following examples are set forth as illustrating the invention:

EXAMPLE 1

15g of germanium dioxide are dissolved in 1.6 l of heated water and filtered. To the resulting filtrate are added 18g of cysteine, and the pH is adjusted to approximately 4. Then, after being gradually heated and made to react for about 2 hours, it is filtered, and concentrated under reduced pressure. The resulting solution is cooled and the reaction product is crystallized out. The crystals are filtered and dried. The yield is about 81 percent.

EXAMPLE 2

The procedure of Example 1 is repeated except that the crystals are crystallized out from the concentrated liquid by addition of ethyl alcohol or methyl alcohol thereto. The thus precipitated substance is separated by filtration and dried. In this case the yield was 97 percent.

EXAMPLE 3

The procedure of Example 1 is repeated except that the crystals are crystallized out from the concentrated liquid by addition of acetone thereto. Then, the crystals are filtered, and dried. In this case, the yield was 97 percent.

Elemental analysis of the substance composed of germanic acid and cysteine produced by this invention showed the following percentages of component elements:

C: 13.87%   H: 3.14%
N: 5.80%    Ge: 29.6 %

As confirming the presence of the SH radical, it showed a positive reaction with the sodium nitroprusside reagent. A photometer test established the quantity of cysteine at 49.4 percent.

The theoretical values in the case of combination between 1 molecule of cysteine and 1 molecule of germanic acid are C: 14.78 percent, H: 3.72 percent, N: 5.74 percent and Ge: 29.6 percent, which are very close to the above mentioned values found by elemental analysis. The compound of this invention corresponds to the combination between 1 molecule of germanic acid and 1 molecule of cysteine. Since an attempt at extraction by means of alcohol does not result in the release of cysteine, it is clear that the substance is not a mixture but a combination.

Thus, it can be established that the subject of this invention is a reaction product that has the formula:

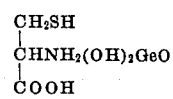

What is claimed is:

1. The compound which is a reaction product of germanic acid and cysteine, in a 1:1 molar ratio.

2. A process of manufacturing the compound of claim 1, comprising adding cysteine to a germanic acid solution obtained as a result of dissolution of germanium dioxide in water, heating said solution with its pH adjusted to the value of approximately 4, concentrating said solution under normal or reduced pressure, causing said compound to come out of the resulting concentrated liquid in crystalline form by cooling or addition of an organic solvent selected from the group consisting of methyl alcohol, ethyl alcohol and acetone, separating the crystalline compound by filtration and drying the separated compound.

* * * * *